United States Patent Office 3,285,743
Patented Nov. 15, 1966

3,285,743
HETEROCYCLIC COMPOUNDS IN ADMIXTURE WITH A TRIPHENYLMETHANE LEUCOCYANIDE DYE FORMER SYSTEM
Meyer S. Agruss, 2849 W. Sherwin Ave., Chicago, Ill.
No Drawing. Filed Mar. 14, 1962, Ser. No. 179,803
27 Claims. (Cl. 96—90)

The present invention relates to the conversion of leucocyanide dyes to a colored form upon exposure to radiation of short wave length. The invention includes new photosensitive compositions, films and coated substrates comprising these photosensitive compositions and new photogenerating processes for the substantially irreversible conversion of the leucocyanide dye to its colored form. The invention also includes the new and stable dyes which are generated.

The conversion of leucocyanide dyes to a colored form upon exposure to short wave length radiation, i.e., radiation having a wave length of up to about 3600 Angstrom units and preferably in the range of from 2400–3000 Angstrom units, is well known. The known processes suffer to some considerable extent in one or more important respects which have prevented the commercial acceptance of known leucocyanide dye conversion processes as the photogenerating system in the reproduction of copy, as in the production of blueprints, in the printing of photographs, and in the enlargement of microfilm records. The more important defects are as follows:

(1) The colored form of the dye tends to revert to its colorless form, even when the print is stored in the dark (the dye image fades);

(2) Acidic substances tend to convert the colorless form of the dye into its colored form upon storage under ambient light conditions or in the dark (the background darkens even before exposure and despite storage in the dark);

(3) Under ambient light conditions and even in the absence of any significant exposure to short wave length radiation, the colorless dye is progressively converted to its colored form (the background of the print darkens under normal lighting conditions);

(4) The speed of conversion of the leucocyanide dye from its colorless form to its colored form upon exposure to short wave length radiation is unduly slow (an undesirably long exposure is required to fully develop the color); and (5) Many prior systems include vaporizable liquids which are lost upon prolonged storage (the unexposed paper becomes progressively less sensitive to short wave length radiation exposure).

While all of these defects are important and a significant improvement in any of them would be considered an advance in the art, the progressive darkening upon exposure to ambient light conditions is possibly of greatest importance because the primary advantage of leucocyanide dye conversion is very rapid reproduction of copy upon mere exposure and this advantage is of reduced significance if the image must be fixed in order that it will survive for reasonable, and preferably extended periods of time.

The term "ambient light" is intended to generally denote lighting conditions normally present indoors.

The invention provides a new photogenerating system in which the conversion of the leucocyanide dye to its colored form is substantially irreversible, new colored dyes having improved stability being formed. The invention further provides photosensitive compositions including films and coated substrates having improved resistance to acid contamination and which, hence, possess improved resistance to darkening upon storage. Also, the invention employs photosensitive compositions which rely upon a new photogenerating process to provide a system in which the incipient instability of known leucocyanide dyes to wave radiation is effectively nullified to provide improved resistance to darkening upon exposure to ambient light conditions.

Preferred compositions in accordance with the invention are storage stable, resist fading and the colorless background resists darkening upon prolonged exposure to ambient light. Moreover, preferred compositions in accordance with the invention develop their full color with great rapidity upon short wave length radiation exposure and normally solid components are employed to reduce loss of sensitivity upon storage due to the loss by volatilization of active components.

In accordance with the invention, a leucocyanide dye adapted to be converted to a colored form upon exposure to short wave length radiation is combined with an organic heterocyclic compound which generates a bifunctional coupling intermediate upon exposure to short wave length radiation. In this manner, when the leucocyanide dye is dissociated by the short wave length radiation exposure, the bifunctional intermediate simultaneously generated by the heterocyclic compound couples with the dissociation products of the colorless dye to produce a new stable colored dye.

Various organic heterocyclic compounds may be used in accordance with the invention. While, broadly, any organic heterocyclic compound which is selectively converted by ultraviolet radiation into a bifunctional intermediate may be used in accordance with the invention, preferred heterocyclic compounds have been found to fall within the group consisting of lactams, lactones, and compounds having at least one epoxy linkage therein. These preferred types of heterocyclic compounds will be more fully described hereinafter.

While it is not my intention to be bound by any theory, it is generally understood that a leucocyanide dye will become colored when it dissociates and that such dissociation is effected by exposure to short wave length radiation. However, the dissociated dye components immediately become reassociated and remain colorless unless some agent is present to maintain the dissociation and thereby cause the dye to exhibit its color. Many such agents are known to the art which terms them "activators," though such term appears to be inaccurate. The known "activators" are all subject to at least some substantial extent to one or more of the defects described hereinbefore. In the invention, it appears that the heterocyclic organic compound which is used is not itself able to maintain the dissociated dye in its dissociated form. As a result, the energy of normal ambient light which tends to slowly dissociate the leucocyanide dye is unable, in the invention, to cause the production of any significant darkening. On the other hand, when the leucocyanide dye is exposed to a strong source of short wave length radiation in the presence of the organic heterocyclic compounds employed in the invention, the radiation dissociates not only the dye, but also the heterocyclic compound to produce a concentration of bifunctional coupling intermediate which, in many instances, highly reactive with the dissociation products of the dye, providing a rapid conversion of the colorless dye into a fully colored coupled form. The actinic radiation stability of the heterocyclic compound is thus substituted for the incipient actinic radiation instability of the dye and a new and more desirable factor is relied upon to control color formation. The coupled product so-produced is stable, and it does not fade perceptibly despite prolonged storage in the dark.

Interestingly, the production of a bifunctional intermediate by exposure to short wave length radiation requires the opening of a cyclic structure whereas, the prior art "activators" do not include any cyclic compounds capable of generating a bifunctional component. Moreover, in the prior art, the leucocyanide dye is used in conjunction with an agent capable of maintaining the leucocyanide dye in its dissociated form. The organic heterocyclic compounds used in the invention appear to be selectively active in the photogenerating process from the standpoint that these cyclic compounds must be exposed to strong ultraviolet radiation before they become active to maintain the leucocyanide dye in its dissociated colored form. Moreover, the heterocyclic compounds are essentially neutral and at least some of these compounds act as buffering agents to maintain a pH in the range of from 6.5–8.5, preferably from 7.0–7.7, so that the photosensitive system is rendered resistant to darkening from traces of acid originating from various contaminating sources such as sizes or other coatings on the substrate or acidic gases in the atmosphere.

In brief summary, the invention in its preferred aspects simultaneously provides:

(1) Increased stability upon storage in the dark;
(2) Increased resistance to darkening under ambient light;
(3) Sensitivity to ultraviolet light maintained for long periods;
(4) Faster conversion to the colored form upon exposure; and
(5) The colored form of the dye is stable and does not fade.

Many of these advantages are obviously inconsistent and their simultaneous achievement is surprising indeed.

From a different perspective, the art of photography has long desired an effective, stable system for the production of prints upon mere exposure to a source of wave radiation and without the need for image development and/or fixing. This long sought goal is achieved in the invention by a practical photogenerating system and the importance of this achievement is self-evident.

Numerous leucocyanide dyes which are adapted to be converted to a colored form upon exposure to short wave length radiation are known. These generally fall within a group which may be identified as leucocyanides of triarylmethane dyes, many of which are well known to the art. The invention preferably employs the triphenylmethane leucocyanide dyes which have the structural skeleton:

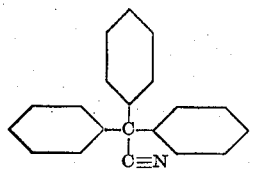

wherein one or more of the phenyl groups is substituted with a primary secondary or tertiary amino group, other additional substituents on the phenyl groups being known and permissible. The triphenylmethane leucocyanide dyes are preferred because these are quite sensitive to short wave length radiation.

Many of the best known triphenylmethane leucocyanide dyes are hydrophobic and these are particularly preferred because they are insensitive to water and do not become colored in the presence of water alone upon exposure to short wave length radiation. A feature of the invention is insensitivity to ambient light and this feature is sacrificed to some extent when hydrophilic dyes are used. The hydrophilic dyes become colored upon exposure to short wave length radiation in the presence of water and are, therefore, less resistant to ambient light darkening when used in the invention since it is not feasible to entirely exclude water in practice. Thus, the invention is most desirably carried out with hydrophobic dyes and the water content of films and coatings in the invention is preferably kept to a minimum to minimize the innumerable side reactions in which water might participate. The normal application of the hydrophobic dye and the agents used therewith from organic solvent solution followed by drying or baking to substantially remove the solvent is adequate to provide films and coatings in which the traces of water which may be present are not significantly detrimental.

Among the preferred hydrophobic leucocyanide dyes which may be included are the leucocyanide of pararosaniline, the leucocyanide of malachite green, the leucocyanide of crystal violet, the leucocyanide of rosaniline, the leucocyanide of new fuchsine, and the like leucocyanides.

While various hydrophilic triphenylmethane dye cyanides are known, these frequently being applied from aqueous medium, the invention would normally employ such dyes in organic solvent medium to minimize the effect of water thereupon. Thus, while hydrophobic dyes are preferred, hydrophilic dyes may be used and these are illustrated by the leucocyanides of formyl violet, ethyl green and aurin.

The leucocyanide dyes having the structural skeleton previously indicated wherein one or more of the phenyl groups is substituted with an amino group, mono- or dialkyl amine group, and wherein the phenyl groups may additionally be substituted with halogen, sulphonic acid, etc., are known in the art. Dyes of this general type illustrated above in which the phenyl groups can be replaced by napthyl groups can also be employed in the practice of this invention, especially at a pH of 6.0–6.05. Suitable dyes containing napthyl groups are illustrated by the leucocyanide of Victoria blue R and the leucocyanide of night blue.

Various organic solvents can be utilized for the leucocyanides of the triphenyl methane dyes. Low boiling or volatile alcohols, ketones, ethers, esters and hydrocarbons are available. Typical examples of organic solvents are methyl alcohol, acetone, methyl ethyl ketone, dioxane, ethyl acetate, benzene, toluene, and mixtures such as 50/50 toluene/ethyl acetate.

The proportions of the ingredients are variable within reasonable limits.

The leucocyanides of the triphenyl methane dyes will be most advantageously utilized in proportions in the order of 0.1–10% by weight of the coating solution, and may include combinations of different leucocyanides to result in any particular color after activation and exposure to ultraviolet light. For example, it is advantageous to utilize the combination of the leucocyanides of malachite green, pararosaniline and crystal violet to result in an activated color which is blue-black.

It is believed that the most advantageous use of the invention lies wherein the proportion of heterocyclic compound ranges from 0.1 to 10 parts by weight to 1.0 part dye leucocyanide. Expressed in weight percent of heterocyclic compound by weight of solution, the optimum range is about 10 to 20% heterocyclic compound, the substantially effective range being about 0.5 to 40% heterocyclic compound by weight of solution.

It is preferred, in accordance with the invention, to employ a substrate which is inert with respect to the photosensitive coatings which are applied thereto. Thus, unsized paper or paper which has been precoated with synthetic resins which do not react with or sensitize the leucocyanide dyes employed are particularly preferred. Nevertheless, the invention is not restricted in its selection of substrate since substrates having adverse effect upon the leucocyanide dyes may be precoated to minimize the adverse effect. Moreover, the incorporation of an epoxy compound as part of the heterocyclic compound used in the invention provides a stabilizing influence with respect to acidic contaminants which may be present in the paper itself or in a size such as a rosin size which may be present on the surface of the paper.

Referring more particularly to synthetic resins which may be used to precoat sized or unsized paper, these are film-forming materials or thickening agents such as, for example, sucrose acetate isobutyrate, and synthetic resin such as methyl methacrylate, polyvinyl acetate, cellulose acetate, polyethylene, butadiene/styrene copolymers, butadiene/acrylonitrile copolymers, acrylic and methacrylic ester polymers and copolymers. These may be applied from organic solvent solution, aqueous emulsion or dispersion, hot melt, etc. When a precoat is applied upon the paper substrate, the coating may advantageously have a thickness of the order of 0.0015–0.003 inch.

Irrespective of the utilization of a precoat, the invention desirably applies the leucocyanide dye and the heterocyclic compound to the paper base or other substrate as a coating in which a synthetic resin forms the surface film. Preferably, the dye, the heterocyclic compound and the resin are combined in a common solvent which is coated on the base and the solvent is then removed to provide the photosensitive coating. Other application procedures are less desirably used such as hot melt application using molten polyethylene, for example. Aqueous emulsion application is feasible and useful in some of the less preferred aspects of the invention, e.g., as when the dye is hydrophilic.

Film-forming synthetic resins which may be used can be selected from those resins which are useful for precoating, as has been described, but it is preferred to employ, as the film-forming resin, a normally solid resinous organic heterocyclic compound so that the resin constitutes at least a portion of the heterocyclic compound. When the heterocyclic compound is selected to be a normally solid epoxy resin, this is particularly preferred and improved resistance to acidic contamination is achieved by such selection. Most preferably, the epoxy resin is used together with a lactone to provide greatest speed of photosensitive reaction in combination with a coating of greatest stability.

As previously indicated, the invention employs in intimate admixture leucocyanide dye convertible to a colored form upon exposure to short wave length radiation and organic heterocyclic compound which generates a bifunctional coupling intermediate upon exposure to short wave length radiation. This bifunctional intermediate may exist as an ion or a free radical. Desirably, the organic heterocyclic compound is an anhydride, especially compounds which are essentially neutral. Moreover, and since it is preferred to employ heterocyclic compounds which do not volatilize rapidly under ambient conditions, it is further preferred that the heterocyclic compound be solid at normal temperature and pressure, e.g., normally solid.

The preferred organic heterocyclic compounds used in the invention are selected from those classes of compounds known as lactones, lactams and compounds containing the epoxy group. All of these are heterocyclic anhydrides, and any one, two or more of these compounds may be used in admixture in accordance with the invention. As previously indicated, these compounds must be exposed to strong ultraviolet radiation before they become active to maintain the leucocyanide dye in its dissociated colored form. In this regard, these compounds exhibit a strong absorption peak in the ultraviolet range as is illustrated by the face that epsilon-caprolactone has a strong absorption peak at 2375 Angstrom units, resorcinol diglycidyl ether has a strong absorption peak at 2050 Angstrom units, and epsilon-caprolactam has a strong absorption peak at 2200 Angstrom units.

Referring first to the epoxy compounds which may be used in accordance with the invention, any compound including the epoxy group, which is used in the present application as being synonymous with the oxirane group, may be used. Thus, monoepoxides and polyepoxides are fully operative. While it is preferred that the oxygen of the heterocyclic oxirane group be joined to adjacent carbon atoms, and still more preferably to be in a terminal position, as in the glycidyl group, the invention is not limited to any specific epoxy compound and includes epoxy compounds in which the oxirane oxygen atom is attached to non-adjacent carbon atoms. More particularly, illustrative epoxy compounds which may be used in the invention include glycidol, butadiene dioxide, epoxidized polyolefins such as commercially available epoxidized polybutadiene, the bisphenol-A-epichlorohydrin reaction products, resorcinol diglycidyl ether, vinylcyclohexene dioxide, alpha-pinene oxide, dipentene monoxide, alphatic hydrocarbon compounds having at least one epoxy group thereon such as 1,2-epoxy hexadiene, 1,2-epoxy octadiene, 1,2-epoxy dodecane, 1,2-epoxy octane, 2,3-epoxy octane, 3,4-epoxy-6-methylcyclohexyl methyl-3,4-epoxy-6-methyl cyclohexane-carboxylate, propylene oxide, styrene oxide, phenyl glycidyl ether, allyl glycidyl ether, butadiene monoxide, 2,3-dicyclopentadiene dioxide, 2,4-dipentene dioxide and epoxidized soybean oil.

Some of the epoxy compounds are extremely fast in their reaction such that the leucocyanide dye is converted to its fully colored condition as a result of exposure to a strong ultraviolet light source in less than 1 second. Among such extremely fast materials are phenyl glycidyl ether, resorcinol diglycidyl ether, 2-glycidyl phenyl glycidyl ether, 2,6-diglycidyl phenylglycidyl ether, dipentene dioxide, vinyl cyclohexene-3-dipeoxide and glycidyl derivatives of aromatic hydroxy compounds, especially polyhydric phenols. A feature of the invention is the utilization of an epoxy compound of resinous character. In this way, the leucocyanide dye is applied in a film-forming material having the capacity to permit the dye to retain its colored form and which, moreover, has the capacity to scavenge acidic contaminants. Thus, the invention preferably employs an epoxy resin having sufficient molecular weight to form a solid film. Moreover, and since the aromatic epoxy compounds are extremely fast in their reaction, the invention preferably employs a polyglycidyl ether of an aromatic polyhydric compound, especially a reaction product of epichlorohydrin and bisphenol A having sufficient molecular weight to be solid under normal conditions of temperature.

A further class of compounds which are highly effective in accordance with the invention is the class of lactones. These are illustrated by beta-propiolactone, butyrolactone, epsilon-caprolactone and methyl-epsilon-caprolactone. All of these are extremely fast in their reaction. Epsilon-caprolactone is particularly preferred. The preferred lactones in the invention are high boiling liquids and are preferably applied together with a synthetic resin to form a resinous film in which the lactone is present in an essentially non-volatile condition.

As is well known, the lactones are cyclic anhydrides of hydroxy acids. Correspondingly, by forming a cyclic anhydride from an amino carboxylic acid, one can form the corresponding lactam and these are also useful in accordance with the invention. Epsilon-caprolactam will illustrate lactams which are useful in the invention, this compound being moderately fast in its reaction, e.g., producing a full color by an exposure of from 5–10 seconds.

In order to combine maximum speed of reaction upon exposure to ultraviolet light radiation with maximum stability, it is preferred to employ the leucocyanide dye in combination with a resinous polyepoxide and a lactone, as is illustrated by the combination of a normally solid resinous condensate of epichlorohydrin and bisphenol A and epsilon-caprolactone.

The invention will be illustrated by the examples which follow; all parts being by weight percent of the coating solution:

Example 1

| | |
|---|---|
| Leucocyanide malachite green | 1.3 |
| Leucocyanide pararosaniline | 1.3 |
| Leucocyanide crystal violet | 0.4 |
| Glycidyl phenyl ether | 21.6 |
| 20% sucrose acetate isobutyrate in 50/50 toluene ethyl acetate | 17.0 |
| 50/50 toluene ethyl acetate | 58.4 |

Example 2

| | |
|---|---|
| Leucocyanide malachite green | 1.3 |
| Leucocyanide pararosaniline | 1.3 |
| Leucocyanide crystal violet | 0.4 |
| Epsilon-caprolactone | 21.6 |
| 50/50 toluene/ethyl acetate | 75.4 |

Example 3

| | |
|---|---|
| Leucocyanide malachite green | 1.00 |
| Leucocyanide pararosaniline | 0.50 |
| Leucocyanide crystal violet | 0.05 |
| Epsilon caprolactam | 0.50 |
| 20% sucrose acetate isobutyrate in 50/50 toluene/ethyl acetate | 17.0 |
| 50/50 toluene/ethyl acetate | 80.95 |

Example 4

| | |
|---|---|
| Leucocyanide malachite green | 1.00 |
| Leucocyanide pararosaniline | 0.50 |
| Leucocyanide crystal violet | 0.05 |
| Epsilon caprolactone | 0.50 |
| 50/50 toluene/ethyl acetate | 80.95 |

Example 5

| | |
|---|---|
| Leucocyanide malachite green | 1.00 |
| Leucocyanide pararosaniline | 0.50 |
| Leucocyanide crystal violet | 0.05 |
| Resorcinol diglycidyl ether | 0.50 |
| 50/50 toluene/ethyl acetate | 97.95 |

The examples above set out were applied as follows:

The paper was coated with a thin coating (approximately 0.003 inch thick) of the dye solution, including the heterocyclic compounds glycidyl phenyl ether, epsilon-caprolactone, epsilon-caprolactam and resorcinol diglycidyl ether, respectively, applied and allowed to dry. The coated paper was then exposed to the radiation emitted from an ultraviolet lamp which was ultraviolet light of 3600 Angstrom units wavelength and less, through a photographic transparency of cellulose acetate composition for one second duration, when the ultraviolet lamp was six inches from the sheet. The minimum time for exposure has been found to be about one-half second. The ultraviolet light which penetrated the transparency caused the heretofore colorless coating to become deeply blue-black in color. The portions unexposed to said radiation remained colorless. Prints utilizing coating compositions of each example were made with like results. The said positive prints made utilizing the teachings of the invention, were exposed to ambient light conditions such as daylight, artificial light such as from incandescent and/or fluorescent lamps and retained the sharp images printed thereon. After long exposure to ambient conditions, darkening of the backgrounds of said prints was minimal and the colored portions did not fade, so that the prints retain their easy readability.

Examples utilizing the general formulations set out above but wherein glycidol, methyl-epsilon-caprolactone, butyrolactone and beta-propiolactone, respectively, were substituted for the glycidyl phenyl ether, epsilon-caprolactone, etc., respectively, of the above examples. The results were identical.

Example 6

| | |
|---|---|
| Leucocyanide malachite green | 1.3 |
| Leucocyanide pararosaniline | 1.3 |
| Leucocyanide crystal violet | 0.4 |
| Epsilon-caprolactone | 15.0 |
| Polyglycidyl ether of bisphenol A having an epoxy value of 0.11 epoxy equivalent per 100 grams and a melting point in the range of from 95–105° C. | 15.0 |
| 50/50 toluene/ethyl acetate | 68.0 |

The solution indicated above is coated upon paper and dried by baking for 15 seconds at 250° F. The paper is storage stable ad remains essentially colorless upon prolonged exposure to actinic radiation. Nevertheless, exposure to ultraviolet light as previously indicated, produces a very rapid transformation of the colorless leucocyanide dyes to their fully colored form. A feature of the invention illustrated in this example is the rapid and efficient production of photosensitive coated paper using heat to rapidly dry the coating. In contrast with the prior art, heat does not cause partial conversion of the leucocyanide dye to its colored form.

Example 7

| | |
|---|---|
| Leucocyanide Victoria blue R | 0.5 |
| Epsilon-caplocatone | 13.4 |
| Polyglycidyl ether of bisphenol A having an epoxy value of 0.11 epoxy equivalent per 100 grams and a melting point in the range of from 95–105° C. | 13.4 |
| Cellulose acetate butyrate, 20% by weight solution in 50/50 toluene/ethyl acetate | 22.3 |
| Dioxane | 50.4 |

Example 8

| | |
|---|---|
| Leucocyanide night blue | 0.5 |
| Epsilon-caprolactone | 13.4 |
| Polyglycidyl ether of bisphenol A having an epoxy value of 0.11 epoxy equivalent per 100 grams and a melting point in the range of from 95–105° C. | 13.4 |
| Cellulose acetate butyrate, 20% by weight solution in 50/50 toluene/ethyl acetate | 22.3 |
| Dioxane | 50.4 |

The solutions indicated above are coated upon paper and dried by baking for 15 seconds at 250° F. to provide an essentially colorless paper which is storage stable and which converts to a dark blue color upon exposure to ultraviolet light for a period of from 5–10 seconds.

While the invention has been illustrated using the preferred heterocyclic anhydrides which are the lactones, the lactams and the epoxy compounds referred to hereinbefore, any heterocyclic compound as previously described which will generate a bifunctionally charged coupling intermediate upon ultraviolet light exposure as described hereinbefore may be uesd in the invention. Less preferred compounds which may be employed are illustrated by hexatol mono- and di-anhydrides such as 1,4:3,6-dianhydro D-sorbitol; 1,4:3,6-dianhydro D-mannitol; and 1,4 anhydro D-sorbitol and the sulfur analogues of the epoxy compounds. To further illustrate the diversity of heterocyclic compounds useful in the invention, reference is made to diketopiperazine.

When short wave length radiation is employed to simultaneously dissociate the leucocyanide dye and the heterocyclic compound, the dissociation products couple together to form new stable dyes.

The invention is defined in the claims which follow:

I claim:
1. A photosensitive paper, sensitive to short wave length radiation having a wave length up to 3600 Angstrom units comprising triphenylmethane leucocyanide dye and organic heterocyclic compound selected from the class consisting of lactones, lactams, compounds containing at least one epoxy group, and mixtures thereof.

2. A photosensitive paper as recited in claim 1 in which said paper carries said photosensitive composition as a coating thereupon.

3. A photosensitive paper as recited in claim 2 in which said coating comprises a film of synthetic resin.

4. A photosensitive paper as recited in claim 2 in which said coating has a pH in the range of from 6.5–8.5.

5. A photosensitive paper as recited in claim 4 in which said coating has a pH of from 7.0–7.7.

6. A photosensitive paper as recited in claim 1 in which said organic heterocyclic compound is normally solid.

7. A photosensitive paper as recited in claim 1 in which said paper carries said photosensitive composition as a coating thereupon, said coating comprising a resinous polyepoxide.

8. A photosensitive paper, sensitive to short wave length radiation having a wave length up to 3600 Angstrom units comprising paper having a photosensitive coating thereupon, said coating comprising triphenylmethane leucocyanide dye and resinous polyglycidyl ether of polyhydric aromatic compound.

9. A photosensitive product comprising a supporting base coated with a photosensitive composition comprising triphenylmethane leucocyanide dye and organic heterocyclic compound selected from the class consisting of lactones, lactams, compounds containing at least one epoxy group, and mixtures thereof.

10. A photosensitive film, sensitive to short wave length radiation having a wave length up to 3600 Angstrom units comprising triphenylmethane leucocyanide dye and resinous polyepoxide.

11. A photosensitive composition, sensitive to short wave length radiation having a wave length up to 3600 Angstrom units comprising a triphenylmethane leucocyanide dye and an organic heterocyclic compound selected from the class consisting of lactones, lactams, compounds containing at least one epoxy group, and mixtures thereof.

12. A photosensitive composition as recited in claim 11 in which said dye is a hydrophobic triphenylmethane leucocyanide dye.

13. A photosensitive composition, sensitive to ultraviolet light radiation comprising triphenylmethane leucocyanide dye and an organic compound having at least one epoxy group thereon.

14. A photosensitive composition as recited in claim 13 in which said organic compound is an aromatic compound carrying the 1,2-epoxy group.

15. A photosensitive composition as recited in claim 13 in which said organic compound is a resinous polyepoxide.

16. A photosensitive compound as recited in claim 15 in which said resinous polyepoxide is a polyglycidyl ether of a polyhydric aromatic compound.

17. A photosensitive composition, sensitive to ultraviolet light radiation comprising triphenylmethane leucocyanide dye and normally solid resinous condensate of epichlorohydrin and a bisphenol.

18. A photosensitive composition, sensitive to ultraviolet light, comprising a triphenylmethane leucocyanide dye and a lactone.

19. A photosensitive composition as recited in claim 18 in which said lactone is a high boiling liquid present in an essentially non-volatile condition in a film of synthetic resin.

20. A photosensitive composition, sensitive to ultraviolet light, comprising a triphenylmethane leucocyanide dye and a lactam.

21. A photosensitive coating composition comprising organic solvent having dissolved therein triphenylmethane leucocyanide dye and organic heterocyclic anhydride selected from the class consisting of lactones, lactams, compounds containing at least one epoxy group and mixtures thereof.

22. A photosensitive coating composition as recited in claim 21 in which said dye is hydrophobic triphenylmethane leucocyanide.

23. A photosensitive coating composition as recited in claim 21 in which said coating solution includes an organic film-forming resin.

24. A photosensitive coating composition as recited in claim 23 in which said resin comprises normally solid resinous polyepoxide.

25. A photosensitive coating composition comprising organic solvent having dissolved therein triphenylmethane leucocyanide dye, organic film-forming resin comprising normally solid resinous polyepoxide and epsilon-caprolactone.

26. A process of irreversible photographic printing by exposure to short wave length radiation having a wave length of up to 3600 Angstrom units comprising exposing a triphenylmethane leucocyanide dye to short wave length radiation while said dye is in intimate admixture with an organic heterocyclic compound selected from the class consisting of lactones, lactams, compounds containing at least one epoxy group and mixtures thereof, to thereby produce a stable colored dye.

27. A new and stable colored dye produced by the process of exposing a triphenylmethane leucocyanide dye and an organic heterocyclic compound selected from the class consisting of lactones, lactams, compounds containing at least one epoxy group and mixtures thereof, to short wave length radiation.

References Cited by the Examiner

UNITED STATES PATENTS

| | | | |
|---|---|---|---|
| 2,829,052 | 4/1958 | Chalkley | 96—90 |
| 2,855,303 | 10/1958 | Chalkley | 96—90 |
| 3,140,947 | 7/1964 | Foris | 96—48 |

OTHER REFERENCES

Gortner et al.: Outlines of Biochemistry, 1944, pages 310–311.

NORMAN G. TORCHIN, *Primary Examiner.*

R. L. STONE, D. PRICE, *Assistant Examiners.*